(12) United States Patent
Mau et al.

(10) Patent No.: US 11,687,781 B2
(45) Date of Patent: *Jun. 27, 2023

(54) IMAGE CLASSIFICATION AND LABELING

(71) Applicant: SEE-OUT PTY LTD, Brisbane (AU)

(72) Inventors: Sandra Mau, Pittsburgh, PA (US);
Sabesan Sivapalan, Kelvin Grove (AU)

(73) Assignee: SEE-OUT PTY LTD, Brisbane (AU)

(*) Notice: Subject to any disclaimer, the term of this patent is extended or adjusted under 35 U.S.C. 154(b) by 30 days.

This patent is subject to a terminal disclaimer.

(21) Appl. No.: 17/308,440

(22) Filed: May 5, 2021

(65) Prior Publication Data

US 2021/0279521 A1 Sep. 9, 2021

Related U.S. Application Data

(63) Continuation of application No. 16/074,399, filed as application No. PCT/IB2017/000134 on Feb. 1, 2017, now Pat. No. 11,074,478.

(Continued)

(51) Int. Cl.
*G06N 3/08* (2023.01)
*G06F 16/55* (2019.01)
(Continued)

(52) U.S. Cl.
CPC ............. *G06N 3/08* (2013.01); *G06F 16/55* (2019.01); *G06F 16/583* (2019.01);
(Continued)

(58) Field of Classification Search
CPC .. G06K 9/6259; G06K 9/6277; G06K 9/6292; G06F 16/55; G06F 16/583; G06N 3/08
See application file for complete search history.

(56) References Cited

U.S. PATENT DOCUMENTS 8,873,812 B2 * 10/2014 Larlus-Larrondo ..... G06T 7/162
382/218
10,102,454 B2 * 10/2018 Merler ................ G06K 9/6268
(Continued)

FOREIGN PATENT DOCUMENTS

WO 2015/035477 3/2015

OTHER PUBLICATIONS

Office Action dated Aug. 2, 2022, in corresponding Japanese Patent Application No. 2021-105527 (with English Translation), 6 pages.
(Continued)

*Primary Examiner* — Shefali D Goradia
(74) *Attorney, Agent, or Firm* — Oblon, McClelland, Maier & Neustadt, L.L.P.

(57) ABSTRACT

A method of training an image classification model includes obtaining training images associated with labels, where two or more labels of the labels are associated with each of the training images and where each label of the two or more labels corresponds to an image classification class. The method further includes classifying training images into one or more classes using a deep convolutional neural network, and comparing the classification of the training images against labels associated with the training images. The method also includes updating parameters of the deep convolutional neural network based on the comparison of the classification of the training images against the labels associated with the training images.

20 Claims, 8 Drawing Sheets

Related U.S. Application Data

(60) Provisional application No. 62/289,902, filed on Feb. 1, 2016.

(51) Int. Cl.

| | | |
|---|---|---|
| *G06F 16/583* | (2019.01) | |
| *G06F 18/214* | (2023.01) | |
| *G06F 18/25* | (2023.01) | |
| *G06F 18/2415* | (2023.01) | |
| *G06V 10/764* | (2022.01) | |
| *G06V 10/774* | (2022.01) | |
| *G06V 10/776* | (2022.01) | |
| *G06V 10/82* | (2022.01) | |
| *G06V 10/44* | (2022.01) | |
| *G06V 20/70* | (2022.01) | |
| *G06V 20/10* | (2022.01) | |

(52) U.S. Cl.
CPC ...... *G06F 18/2155* (2023.01); *G06F 18/2415* (2023.01); *G06F 18/254* (2023.01); *G06V 10/454* (2022.01); *G06V 10/764* (2022.01); *G06V 10/774* (2022.01); *G06V 10/776* (2022.01); *G06V 10/82* (2022.01); *G06V 20/10* (2022.01); *G06V 20/70* (2022.01)

(56) References Cited

U.S. PATENT DOCUMENTS

| | | | | |
|---|---|---|---|---|
| 10,282,677 | B2* | 5/2019 | Merler | H04N 21/00 |
| 2014/0086497 | A1 | 3/2014 | Fei-Fei | |
| 2015/0254532 | A1 | 9/2015 | Talathi et al. | |
| 2017/0109615 | A1 | 4/2017 | Yatviz | |
| 2018/0089540 | A1 | 3/2018 | Merler | |
| 2018/0373960 | A1 | 12/2018 | Xu | |
| 2019/0251392 | A1* | 8/2019 | Brown | G06V 10/82 |
| 2020/0401851 | A1 | 12/2020 | Mau et al. | |

OTHER PUBLICATIONS

Examination report No. 1 for standard patent application dated Jul. 21, 2022, in corresponding Australian Patent Application No. 2021203831, 6 pages.
Office Action dated Apr. 30, 2021 in corresponding European Patent Application No. 17 747 065.5 (with English Translation), citing document AX therein, 4 pages.
Celine Yens et al: "Decision Trees for Hierarchical Multi-Label Classification", Machine Learning, vol. 73, No. 2, XP019646600, Aug. 1, 2008, pp. 185-214, ISSN: 1573-0565, DOI: 10.1007/S10994-008-5077-3.
Examination report No. 4 for standard patent application dated May 20, 2021 in corresponding Australian Patent Application No. 2017214619 citing documents AA and AX therein, 6 pages.
Dumais, S. et al., "SIGIR '00: Proceedings of the 23rd annual international ACM SIGIR conference on Research and development in information retrieval", Jul. 2000, pp. 256-263, https://doi.org/10.1145/345508.345593.
Deng, Jia, et al. "Large-scale object classification using label relation graphs." European conference on computer vision. Springer, Cham, 2014. (Year: 2014).
Hu, Hexiang, et al. "Learning Structured Inference Neural Networks with Label Relations." 2016 IEEE Conference on Computer Vision and Pattern Recognition (CVPR). IEEE, 2016. (Year: 2016).
Gong, Y. et al.—"Deep Convolutional Ranking for Multilabel Image Annotation"—Cornell University Library—Apr. 14, 2014, whole document.
Simony An, K. et al.—"Deep Inside Convolutional Networks: Visualising Image Classification Models and Saliency Maps"—Cornell University Library—Apr. 19, 2014, whole document.
Krizhevsky, A. et al.—"ImageNet Classification with Deep Convolutional Neural Networks", Advances in Neural Information Processing Systems 25 (NIPS 2012) whole document.
Wei, Y. et al.—"CNN: Single-label to Multi-label",—Journal of Latex Class Files, vol. 6, No. 1, January 201 whole document.
International Search Report issued in PCT/IB2017/000134, dated May 23, 2017, 4 pages.
European Extended Search Report issued in EP 17747065.5, dated Aug. 22, 2019, 6 pages.
Min-Ling Zhang et al: "Multilabel Neural Networks with Applications to Functional Genomics and Text Categorization", IEEE Trans on Knowledge and Data Engineering, Oct. 2006, pp. 1338-1351, XP055612826, DOI: 10.1109/TKDE.2006.162.
Search Report and Written Opinion issued in application No. I 1201806541 R, Jan. 28, 2020, 9 pages, Intellectual Property Office of Singapore.
Huang Y. et al., Multi-Task Deep Neural Network for Multi-Label Learning. 2013 IEEE International Conference on Image Processing, Sep. 15, 2013, pp. 2897-2900.
Vallet A. et al., A Multi-Label Convolutional Neural Network for Automatic Image Annotation. Journal ofInformation Processing, Jul. 1, 2015, vol. 23, No. 6, pp. 767-775.
Zhang M.-L et al., Multi-Label Neural Networks with Applications to Functional Genomics and Text Categorization. IEEE Transactions on Knowledge and Data Engineering, Oct. 1, 2006, pp. 1338-1351.
Cerri R. et al., Hierarchical multi-label classification using local neural networks. Journal of Computer and System Sciences, Mar. 22, 2013, pp. 39-56.
Examination Report dated Sep. 23, 2020 in corresponding Australian Patent Application No. 2017214619.
Vallet, Alexis, and Hiroyasu Sakamoto. "A multi-label convolutional neural network for automatic image annotation." Journal ofInformation processing 23.6 (2015): 767-775. (Year: 2015).
Everingham, Mark, et al. "The pascal visual object classes (voe) challenge." International journal of computer vision 88.2 (2010): 303-338. (Year: 2010).
Leskovec, Jure, et al. Mining of massive datasets. 3rd ed., Cambridge University Press, 2014, pp. 509-556. (Year: 2014).
Gulcehre, Caglar, et al. "Noisy Activation Functions." arXiv preprint arXiv: 1603.00391 v1 (2016). (Year: 2016).
Office Action dated Dec. 22, 2020 in corresponding Japanese Patent Application No. 2018-558501.
M. Saito et al., "Illustration2Vec: A Semantic Vector Representation of Illustrations", SIGGRAPH Asia 2015 Technical Briefs, ACM, 2015, pp. 5:1-5:4, URL, https://dl.acm.org/doi/pdf/10.1145/2820903.2820907.
Bannour, Hichem, and Celine Hudelot. "Hierarchical image annotation using semantic hierarchies." Proceedings of the 21st ACM international conference on Information and knowledge management. 2012. (Year: 2012).
Deng, Jia, et al. "Imagenet: A large-scale hierarchical image database." 2009 IEEE conference on computer vision and pattern recognition, Ieee, 2009. (Year: 2009).
European Office Action dated Dec. 22, 2022 in European Patent Application No. 17 747 065.5, citing reference 24 therein, 5 pages.
Yan et al., "HD-CNN: Hierarchical Deep Convolutional Neural Networks for Large Scale Visual Recognition", 2015 IEEE International Conference on Computer Vision (ICCV), 2015, pp. 2740-2748, XP032866619.

\* cited by examiner

IMAGE CLASSIFICATION AND LABELING

CROSS-REFERENCE TO RELATED APPLICATIONS

The present application is a continuation of U.S. patent application Ser. No. 16/074,399, filed Jul. 31, 2018, which is a National Stage Entry of PCT/IB2017/000134, filed Feb. 1, 2017, which claims the benefit of U.S. Provisional Patent Application No. 62/289,902, filed Feb. 1, 2016, each of which is incorporated by reference herein in its entirety for all purposes.

TECHNICAL FIELD

The present disclosure relates generally to image classification, and more particularly to training image classification models based on training images associated with multiple classes and classifying images into multiple classes using the trained image classification models.

BACKGROUND

Trademarks, logos, other graphically designed images, and other brand related intellectual properties are important business assets. Many countries provide formal mechanisms for people and companies to protect their IP, including trademarks, designs, etc. that may include graphically designed images, via trademark registration and design patent registration. For example, trademark registration systems may enable a company to register its name and logos in a trademark database and to object to or enforce against other names or logos that may be similar. Similarly, design patents in the U.S. and registration of industrial designs in other countries or regions (e.g., Europe) provide formal protection for designs that have a wide variety of graphical representation including line drawings, 3D CAD models along with 2D perspective views, 2D images like graphical user interfaces and surface ornamentation, etc.

Many trademark offices around the world label trademarks with a list of keywords or codes (e.g., design codes in the U.S., Vienna Codes in Europe, and image constituents in Australia) that semantically describe elements or objects inside, for example, a graphical image. To illustrate, U.S. design codes and Vienna Codes are class labels that are semantically descriptive of images and/or objects in images. These class labels have hierarchical structures and are used to classify the figurative elements of an image. In general, the hierarchical structures of labels used in some IP registration systems proceed from the general to the more particular, for example, considering the figurative elements of trademarks in hierarchical levels starting from categories, followed by divisions that are followed by sections. Some IP registration systems may use single level (non-hierarchical) systems while others may have less or more than three levels of hierarchy.

For design patents and industrial designs, many IP offices have adopted a classification system called Locarno classifications and product indications to both describe a product and its appearance. The U.S. has its own set of design classifications called U.S. Design Classes. Both Locarno and U.S. Design Classes are hierarchical in nature with the top level typically describing the function of the product and sub classes describing specific functional feature, distinctive ornamental appearance, or form. Non-governmental organizations may also use similar types of labels for classifying and/or annotating the graphical assets such as logos and designs.

IP owners have to enforce their IP rights through watching and addressing potential infringement and efforts to register similar trademarks and designs. However, finding infringing use of images, for instance, on e-commerce sites, or finding misuses of a brand in social networks or the internet can be challenging. Further, companies have challenges in searching for registered trademarks or designs to determine whether to use and/or attempt to register a name, logo, or design.

In many IP registration systems including in the U.S. and Europe, multiple labels may be associated with an image or with an element/object in an image (e.g., a trademark or a design). The labels may also be hierarchical labels. Labels that may be associated with an image or an image object/element may be herein referred to as multi-labels.

Thus, systems and methods that enable classifying images and/or objects/elements in images into multiple classes are desirable.

SUMMARY

The present disclosure relates generally to image classification, and more particularly to training image classification models based on training images associated with multiple classes (with class labels) and classifying images into multiple classes (with class labels) using the trained image classification models. In an example embodiment, a method of training an image classification model includes obtaining training images associated with labels, where two or more labels of the labels are associated with each of the training images and where each label of the two or more labels corresponds to an image classification class. The method further includes classifying training images into one or more classes using a deep convolutional neural network, and comparing the classification of the training images against labels associated with the training images. The method also includes updating parameters of the deep convolutional neural network based on the comparison of the classification of the training images against the labels associated with the training images.

In another example embodiment, a method of classifying images using one or more image classification models includes obtaining, by an image processing device, training images associated with labels, wherein two or more labels of the labels are associated with each of the training images and wherein each label of the two or more labels corresponds to an image classification class. The method further includes training, by the image processing device, a deep convolutional neural network using the training images and the labels associated with the training images. The method also includes classifying, by the image processing device, an input image into two or more classes based on the trained deep convolutional neural network.

In yet another example embodiment, a system for classifying images using one or more image classification models includes a training image source comprising training images associated with labels, wherein two or more labels of the labels are associated with each of the training images. The system further includes an image processing device communicably coupled to the training image source, wherein the image processing device is configured to obtain the training images from the training image source and to train a deep convolutional neural network using the training images and the labels associated with the training images. The system may also include an input image source comprising input images to be classified into classes, wherein classifying an input image into multiple classes associates the input image with multiple classes corresponding to the multiple classes.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
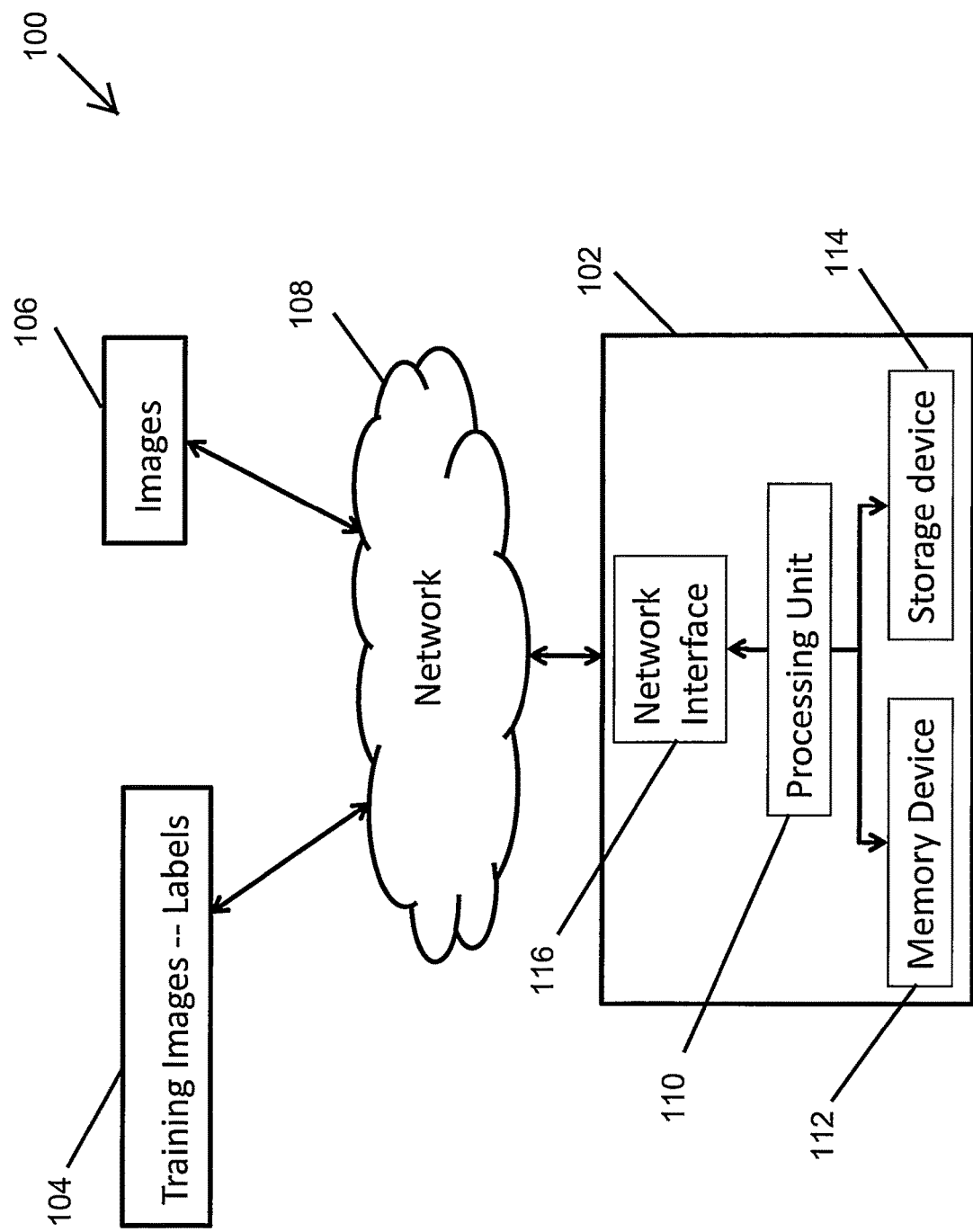
FIG. 1 illustrates a system for training image classification models and for classifying images according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION

In the following paragraphs, example embodiments will be described in further detail with reference to the figures. In the description, well known components, methods, and/or processing techniques are omitted or briefly described. Furthermore, reference to various feature(s) of the embodiments is not to suggest that all embodiments must include the referenced feature(s).

In some example embodiments, systems and methods that are based on convolutional neural network may be used to classify images into multiple classes such that the images are each associated with respective multiple labels. To illustrate, one or more convolution neural networks (also referred to herein as a classification models) are first trained, and the trained convolutional neural networks are then used to classify images. Labels that can be associated with a single image or with an element/object in an image may be referred to herein as labels, multiple labels, or multi-labels.

In some example embodiments, during a training operation, a convolutional neural network (e.g., a deep convolutional neural network) may be trained such that parameters of the network are learned using training images tagged (for example, manually) with multi-labels that describe visual-semantic meanings of the images. During classification operations, the trained convolutional neural network is used to classify other images such that multi-labels are associated with the images. For example, the images classified by the trained network may be tagged or otherwise associated with multi-labels that describe visual-semantic meanings of the images. As described in more detail below, the trained convolutional neural network (i.e., the trained classification model) may include several layers including convolutional, pooling, activation, gating, dense connection and drop out to robustly classify an image such that the image is associated with appropriate multi-labels.

In some example embodiments, the multi-labels associated with training images and also used to classify images may be hierarchical labels. To illustrate, when the multi-labels are hierarchical labels, a respective trained classification model (i.e., a respective convolutional neural network) may be trained for each level of the hierarchical labels. For example, three convolutional neural networks may be trained when the training images are tagged or otherwise associated with multi-labels that have three hierarchies. During classification operations, multiple trained classification models may be used to classify images such that the images are tagged or otherwise associated with the hierarchical multi-labels at each hierarchy level.

To illustrate, images and associated semantic descriptive labels, such as U.S. design codes, Vienna codes, and keywords image constituents, used in trademark databases can be used to train very large deep convolution neural networks that can encode the semantic information into feature maps. The trained convolution neural networks (i.e., the classification models resulting from the training operation) may then be used to classify other images such that the images are associated with respective semantic descriptive labels used in the trademark databases.

For example, Table 1 illustrates example labels that are based on semantic descriptions of images that may be registered as trademarks in the U.S. Please note that the particular images that have been tagged or otherwise associated with the labels are not shown in Table 1.

| | Labels using U.S. Design Codes | | |
|---|---|---|---|
| Image | "Category" | "Division" | "Section" |
| Image 1 | 24 - Heraldry, flags, crowns, crosses, arrows, and symbols 26 - Geometric figures and solids | 24.05 - Seals 26.01 - Circles 26.05 - Triangles | 24.05.01 - Seals, circular or elliptical; Circular or elliptical seals 26.01.11 - Circles comprised of plants; Letters, numerals, punctuation, geometric figures, objects, humans, plants or animals comprising a circle; Circles comprised of punctuation 26.05.13 - Triangles, exactly two triangles; Two triangles 26.05.16 - Triangles touching or intersecting 26.05.21 - Triangles that are completely or partially shaded |
| Image 2 | 01 - Celestial bodies, natural phenomena, geographical maps 18 - Transport; equipment for animals; traffic signs 26 - Geometric figures and solids | 01.07 - Globes 18.09 - Air or space vehicles 26.17 - Lines, bands, bars, chevrons and angles | 01.07.25 - Globes, other 18.09.01 - Gliders, airplane; Airplanes 26.17.07 - Speed, lines depicting; Propulsion, lines depicting; Lines depicting speed, propulsion, heat or wind; Wind, lines depicting; Heat, lines depicting |

As illustrated in Table 1, the multi-labels are intended to provide semantic descriptive information about the image 1 and image 2. The labels in Table 1 also have a hierarchical structure where the hierarchies are "Category," "Division," and "Section." For example, the highest hierarchy, "Category," provides more general semantic description of the images compared to the lower hierarchies. The next highest hierarchy, "Division," provides more general semantic description of the images compared to the lower hierarchy, "Division," but more specific semantic description than the highest hierarchy, "Category." In some alternative embodiments, hierarchical multi-labels may have a different hierarchical relationship than shown in Table 1 without departing from the scope of this disclosure. In contrast to some image databases/datasets, each image in Table 1 is associated with multiple labels at each hierarchy.

FIG. 1 illustrates a system 100 for training image classification models and for classifying images according to an example embodiment. The system 100 may include an image processing device 102, a training image source 104, and an input image source 106. The image processing device 102 may communicate with the training image source 104 and the input image source 106 over a network 108. For example, the network 108 may be the internet, a local area network, a wide area network, or a combination thereof. Alternatively or in addition, the network 108 may be or may include a cable connection such as, for example, a universal serial bus (USB) cable connection.

In some example embodiments, the training image source 104 may include one or more databases of images tagged or otherwise associated with multi-labels. The images from the training image source 104 may be used by the image processing device 102 to train convolutional neural networks (i.e., classification models) that can be used to classify other images such as the images from the input image source 106. The training images may be graphically designed images (e.g., line drawings, 2D perspective views of 3D CAD models, 2D drawings, etc.), photos, other types of images, or a combination of two or more of the preceding. The training images may be trademarks, logos, and product designs including images used in design patents and industrial design registrations, etc. The training image source 104 may include image databases that include millions of images or few images depending on a particular application. The training image source 104 may be one or more standalone data storage devices, data storage devices of a computer or computer network, or another device or system that may be used to provide images along with the associated multi-labels. For example, the training image source 104 may include a storage device (e.g., a static random access memory or another type of computer readable medium). The multi-labels associated with individual training images provided by the training image source 104 to the image processing device 102 may be in a form of metadata of the individual training images or in another format that otherwise associates the individual training images with respective multi-labels. In some example embodiments, hundreds or thousands of possible visually semantic (i.e., semantically descriptive) labels may be potentially used to label training images. The training image source 104 may be a storage device (e.g., a static random access memory, etc.) that is communicably coupled to the image processing device 102.

In some example embodiments, the multi-labels associated with the images from the training image source 104 may have a hierarchical structure as described above. Alternatively, the multi-labels may be non-hierarchical. As a non-limiting example, the training image source 104 may include a database of one or more IP registration organizations, such as the U.S. Patent and Trademark Office, and the multi-labels may be semantically descriptive labels, such the U.S. Design Codes or other semantically descriptive codes.

In some example embodiments, the input image source 106 may include one or more databases of images that can be classified by the image processing device 102 using convolutional neural networks (i.e., classification models) that are trained using the training images that are tagged or otherwise associated multi-labels and provided by the training image source 104. The images included in the input image source 106 may be graphically designed images (e.g., line drawings, 2D perspective views of 3D CAD models, 2D drawings, etc.), photos, other types of images, or a combination of two or more of the preceding. The images provided by the input image source 106 may be trademarks, logos, product designs including images used in design patents and industrial design registrations, etc. The input image source 106 may include image databases that include millions of images or few images depending on a particular application, and may be classified into hundreds or thousands of classes (i.e., the images may be labeled by some of possible hundreds or thousands of labels). The input image source 106 may be one or more standalone data storage devices, data storage devices of a computer or computer network, or another device or system that may be used to provide images to be classified by the image processing device 102. For example, the input image source 106 may include a storage device (e.g., a static random access memory or another type of computer readable medium). In some example embodiments, the input image source 106 may include a user device that submits one or more images that a user want classified by the image processing device 102. Alternatively or in addition, the input image source 106 may include a web page that includes images with metadata.

In some example embodiments, the image processing device 102 includes a processing unit 110, such as a central processing unit, a memory device 112, a storage device 114, and a network interface 116 as well as other components that support the function of the image processing device 102 to train classification models and classify images. The network interface 116 may be used by the image processing device 102 to communicate with other devices including the training image source 104 and the input image source 106. For example, one or both of the training image source 104 and the input image source 106 may be local storage devices that are communicably coupled to the image processing device 102 by respective cable (e.g., a USB cable or CAT 5 cable) via the network interface 106. In some example embodiments, the training image source 104 and the input image source 106 may be a single device that includes training images with associated multi-labels as well as images that need to be classified.

In some example embodiments, the processing unit 110 may include multiple processor units including specialized (e.g., graphics) processing units. For example, computer executable code may be stored in the storage medium 112 and may be executed by the processing unit 110 to implement the training of classification models based on the training images and the classification of images based on the trained classification models. For example, the memory device 112 may include one or more static random access memory devices or another type of non-transitory computer readable media.

In some example embodiments, the storage device 114 may be used to store executable code and/or data including image data, labels, and/or other information related to the training of classification models and the classification of images. For example, in some embodiments, the storage device 114 may be used to store training images previously received from the training image source 104 or another source of training images that have associated labels. Alternatively or in addition, the storage device 114 may be used to store images to be classified by the image processing device 102. The storage device 114 may include one or more static random access memory devices or another type of non-transitory computer readable media.

In some example embodiments, the memory device 112 and/or the storage device 114 may be used to store a list of multi-labels applicable to a particular database of training images. For example, a complete or a particular portion of semantically descriptive labels used by an organization to classify trademark or design images (e.g., graphically designed images) may be stored in the storage device 114 for use by the image processing device 102 during the training of the classification models and/or during the classification of images.

By using convolutional neural network(s) trained with training images and multiple labels associated with individual images of the training images, the system 100 can perform reliable classification of images into multiple classes. The use of the convolutional neural networks described herein to classify images improves the image classification capability of the image processing device 102 by enabling classification of images into multiple classes (i.e., associate images with multiple labels) as compared to systems and neural networks that are limited to mutually exclusive labels, where each image (or set of pixels in an image) is associated with a single label and classified accordingly. For example, in systems and neural networks that are limited to mutually exclusive labels, an image can be considered to contain "car" or "human" labels but not both. In contrast, the labels used by the system 100 may be non-mutually exclusive labels, where a label is may be associated with multiple images or objects in images. Further, the system 100 enables labels to be associated with multiple classes of images. For example, if a class of images is that of dogs and another class of images is that of cats, the system 100 enables a semantically descriptive label (e.g., furry) to be associated with both images from both classes.

In some example embodiments, the image processing device 102 may be implemented using hardware (e.g., FPGA or a microprocessor), software, or a combination of hardware and software. Further, some of the components of the image processing device 102 may be omitted or integrated into a single component without departing from the scope of this disclosure. Although the image processing device 102 is shown as a single device, in some example embodiments, the image processing device 102 may be a system of multiple components/devices. Although particular components of the system 100 are shown in FIG. 1, the system 100 may include fewer or more components than shown. Descriptions provided herein with respect to an image or images may be applicable to objects/elements in the image(s).

Figure 2:
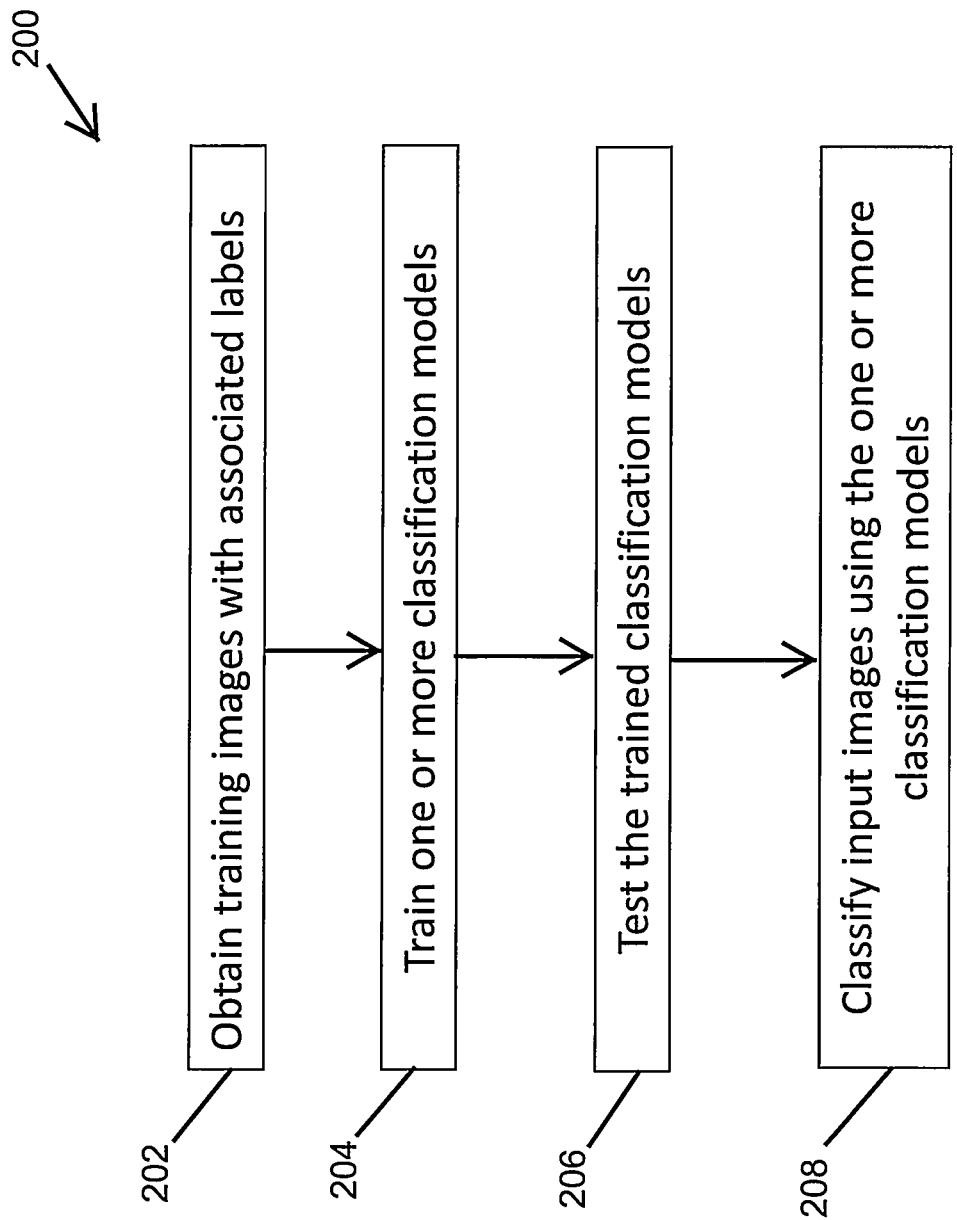
FIG. 2 illustrates a method of training image classification models and classifying images according to an example embodiment.

FIG. 2 illustrates a method 200 of training image classification models and classifying images according to an example embodiment. Referring to FIGS. 1 and 2, in some example embodiments, the method 200 includes obtaining training images with associated labels at step 202. For example, the image processing device 102 may obtain training images tagged or otherwise associated with multi-labels from the training image source 104. Alternatively, the image processing device 102 may obtain the training images and associated labels from another device such as the storage device 114.

The method 200 includes training one or more classification models (i.e., convolutional neural networks) at step 204. For example, the system 100 of FIG. 1 may be used to train one or more convolutional neural networks. The fundamental concepts of convolution layers are weight sharing and encoding multiple feature maps. Weight sharing allows extracting visual information regardless spatial location (translational invariance) and multiple parallel feature maps allow extracting different types/levels of details of an image simultaneously. Description of convolutional neural networks may be found in Y. LeCun, L. Bottou, Y. Bengio, and P. Haffner, "Gradient-based learning applied to document recognition," Proc. IEEE, vol. 86, no. 11, pp. 2278-2323, 1998, the content of which is incorporated herein by reference.

Figure 3:
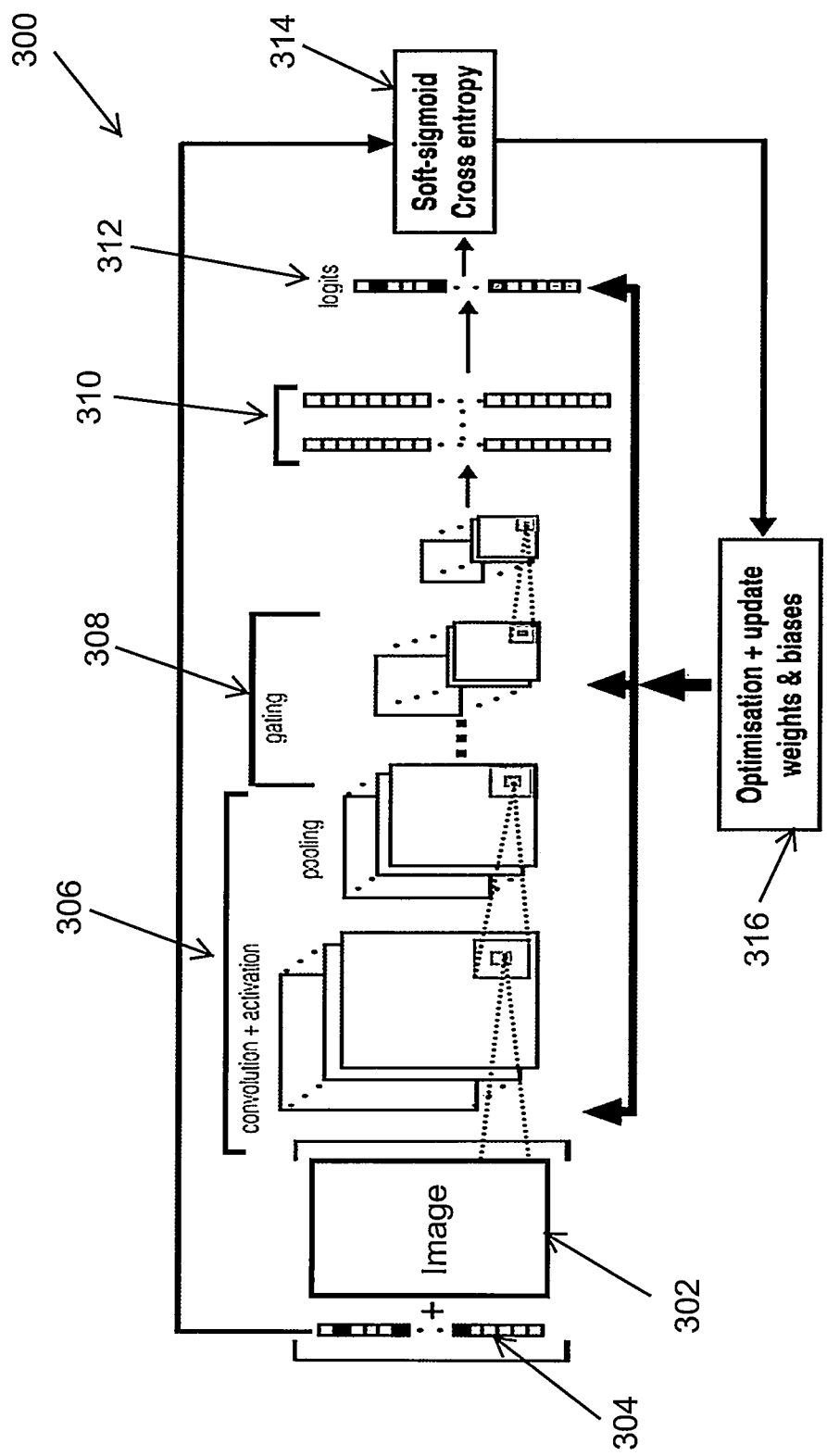
FIG. 3 illustrates a method of training image classification models (i.e., convolutional neural networks) according to an example embodiment.

As described in more detail with respect to FIG. 3, a convolutional neural network trained based on the training images obtained at step 200 may be a deep convolutional neural network that includes several layers. The training of a convolutional neural network includes tuning/updating of weights and biases of the network kernels by iteratively doing gradient optimization on labelled data (e.g., human labelled data). In contrast to convolutional neural networks that use softmax activation or sigmoid activation at the classification layer, the convolutional neural networks used by the system 100 and in the method 200 use soft-sigmoid activation described below for reliable classification of images into multiple classes (i.e., to associate multiple images with an image). For example, convolutional neural networks that use softmax activation at the classification layer require mutually exclusive classes/labels. Convolutional neural networks that use sigmoid activation at the classification layer or sigmoid activation of the last layer or sigmoid-cross entropy for the objective function during training can suffer from negative saturation and hanging within local minima. By using the convolutional neural network with soft-sigmoid activation at the classification layer or soft-sigmoid-cross entropy for the objective function during training, the system 100 and the image processing device 102 may train one or more convolutional neural networks using images tagged or otherwise associated with multiple labels (i.e., multi-labels) and may reliably and efficiently classify images into multiple classes (i.e., associate images with multiple labels) using the trained one or more convolutional neural networks. In some alternative embodiments, the system 100 and the method 200 may use a different means to prevent or recover from negative saturation without departing from the scope of this disclosure.

In some example embodiments, a respective convolutional neural network may be trained based on each hierarchical level of hierarchical multi-labels (e.g., U.S. Design codes, Vienna codes, etc.) associated with images or objects/elements in images. In general, the training images and associated multi-labels used in the training of convolutional neural network(s) used by the system 100 and in the method 200 may be non-hierarchical or hierarchical.

In some example embodiments, the training images may be optionally pre-processed, for example, for better data augmentation. For example, the training images may be resized to fixed height and width. The aspect ratio of the images may be maintained by padding the shorter size with, for example, black, white and edge color. Grayscale and binary version of RGB images may also be used as data augmentation. As another example of pre-processing, the training images may be pre-whitened, and random contrast, random brightness and random flips and rotation may also be applied during each iteration.

In some example embodiments, the method 200 may include testing the trained convolutional neural network(s) (i.e., trained classification models) at step 206. For example, a sample of the training images and associated multi-labels from the training image source 104 or another source may be provided to the image processing device 102 to test/benchmark the trained convolutional neural network(s). Additional refinement of the convolutional neural network(s) may be performed, for example, using more training images if the performance of the system 100 or the method 200 is below a threshold. In some alternative embodiments, the testing of the trained classification models may be omitted without departing from the scope of this disclosure.

In some example embodiments, the method 200 includes classifying input images using the one or more trained classification models (i.e., trained convolutional neural network(s)) at step 208. For example, the input images may be received by the image processing device 102 from the input image source 106 or from another source such as the storage device 114. The image processing device 102 may classify the input images by based on one or more trained classification models. For example, for a particular dataset of images that are to be classified based on non-hierarchical labels, the system 100 may train a single classification model that is used to classify corresponding input images. For another dataset of images that are to be classified based on hierarchical labels, the system 100 may train a single classification model that is used to classify corresponding input images. By classifying the input images into multiple classes, the image processing device 102 effectively labels, tags or otherwise associates classified input images with multi-labels. In some example embodiments, one or more of the input images may be classified in single class when the images or objects/elements in the images fall only under a single class.

FIG. 3 illustrates a method/system 300 of training image classification models (i.e., convolutional neural networks) according to an example embodiment. Referring to FIGS. 1-3, a deep convolutional neural network may include convolution and pooling layers 306, fully connected layers 310, and a logits layers 312 as illustrated in FIG. 3. In the convolution layers, weight sharing kernels are scanned on input feature-maps (image or output of the previous layers), and non-linear activation function like ReLU, ELU, sigmoid and etc. are used to generate input for the next set of layers. Usage of weight sharing kernels enables translational invariance and multiple parallel kernels enable extracting different visual information.

A pooling layer is used in between convolution layers to reduce the dimension of input feature map. In pooling, weight-sharing kernel is scanned with more than one-pixel stride length (commonly stride length of two is used) and get the maximum value within the kernel region. Instead of maximum, any statistical aggregation function can be used (maximum: max-pooling, min: min-pooling and etc.). Pooling layer helps to reduce the dimensionality and disregard noise.

These convolution layers and pooling layers of the convolution and pooling layers 306 are repeated number of times to make sure visual information are extracted in multiple levels (from global details to finer details). When the network is deeper with multiple convolution and pooling layers, image information from beginning of the network is transferred to the deeper side of the network using gating 308.

Hyper parameters of the network (number of layers, kernel size, number of gating and number of kernels) are set based on complexity of image data and number of labels used in application. Part of the network also can be repeated in parallel and concatenated together if an application is more complex and requires learning more feature maps to different classification labels, resulting in the network being relatively wide.

In general, the convolution and pooling layers 306 perform the following main operations: 1) Convolve weight sharing kernels on the pre-processed input image; 2) Apply relevant pooling (max, mean, min) on the generated feature maps to accommodate image invariances (e.g., translation); and 3) Use an appropriate activation function (ReLU, Sigmoid, ELU, etc.) to map the pooled feature to non-linear output. These main operations are repeated with a combination of different kernel sizes (3×3, 5×5, 11×11), activation functions and gating (highway, skip) to capture the different levels of visual features. With deeper convolution network, smaller kernel size with larger number of feature maps are used to adapt smaller receptive field with finer details.

The outputs of the last convolution layers of the convolution and pooling layers 306 are concatenated together and densely mapped to fully connected layers 310. Different scales of drop-out are used to make sure the network is not over-fitted. The fully connected layers 310 make sure the visual information extracted from convolution layers are narrowed to map classification labels.

The logits layer (i.e., soft-sigmoid layer) 312 is used to map the output of last fully connected layer (H) to get the confidence scores for each classification labels. The soft-sigmoid layer is defined as:

$$\text{soft-sigmoid: } H \rightarrow \gamma * Fg(H) + (1-\gamma) * Fs(H)$$

Where Fs is a sigmoid function. Fg is any non-linear function that satisfies $\partial Fg(H)/\partial H \neq 0$, (function that has non-zero gradient value for all the range of input). An example function that works in that context is softmax. Other activation functions like ReLU, ELU also satisfy this requirement. $\gamma$ sets the weights to Fg and Fs. During the training of the convolutional neural network, $\gamma$ is set to a function that correlates with cumulated cross-entropy loss (boosting Fg when the model is with higher loss). This process helps to bring back the false positive and false negative confidence scores that hang in the negative saturated regions of sigmoid. During classification of input images using the trained convolutional neural network, $\gamma$ is set to 0 to produce independent confident scores for each label.

Training the convolutional neural network using the images 302 with multi-labels 304 is done by back-propagating the network to minimize the cross-entropy between soft-sigmoid activation logits and the ground truth labels. Updating of parameters such as weights and biases and other optimizations are performed by the optimization and updating module 316 based on output of the soft-sigmoid cross-entropy module 314. Mini-batch with the size of (64, 128, 256) from random shuffled input image data queue may be used as input to generalize loss function between the training images that belong to different classes.

As described above, when the labels 304 have a hierarchical structure, separate models are trained for each level of the hierarchy of labels. The number of convolution layers, kernel size, type of activation, pooling and gating, number of fully connected layers, number of neurons on the fully connected layers varies with the number of labels, number of training images used, type of labels used and type of training images etc. For example, if the network needs to classify large number of labels (thousands or more) a convolutional neural network with a large number of layers (similar to vgg16, Resnet101) is more appropriate to capture the complex structure of the visual features.

Figure 4:
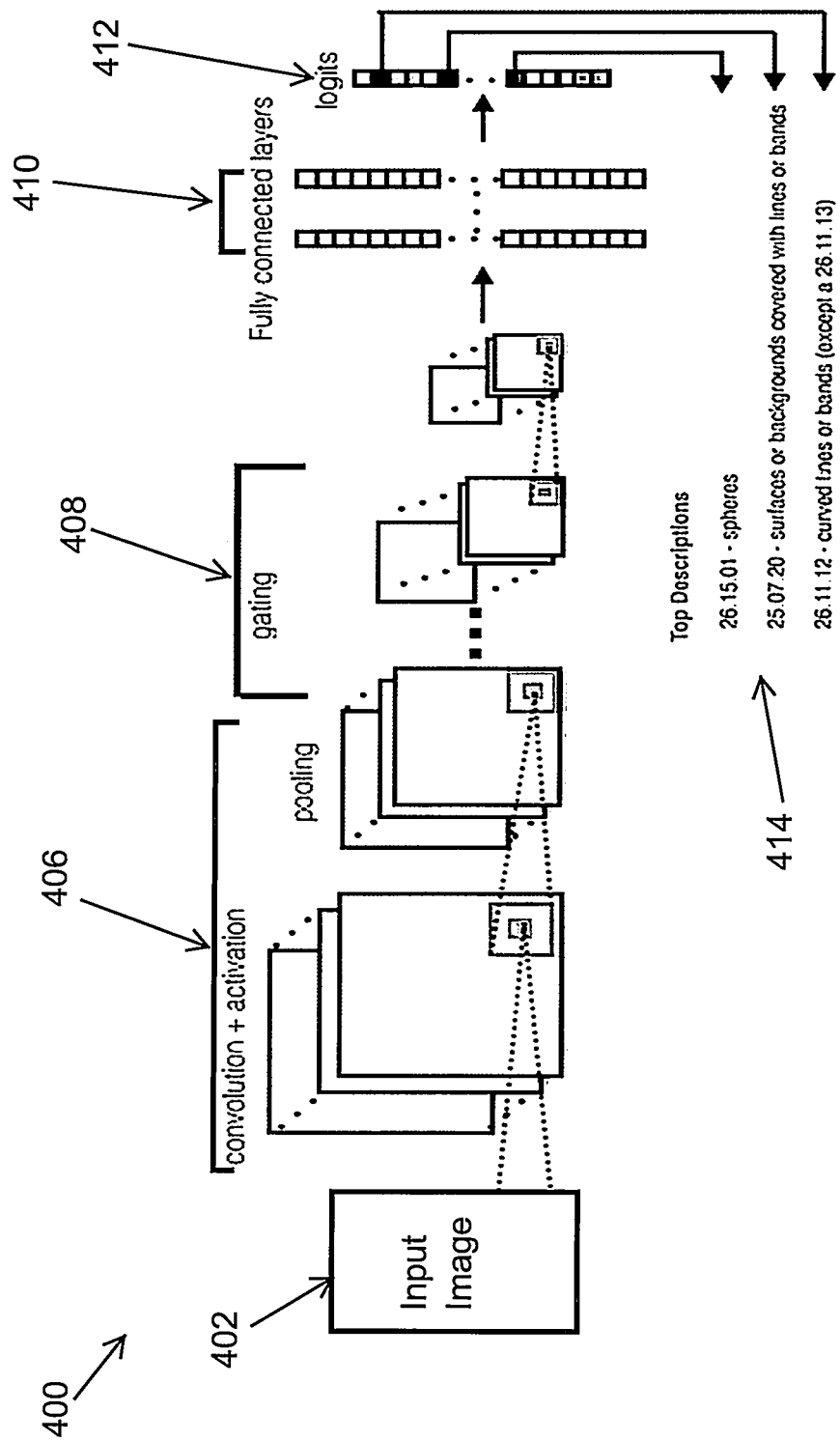
FIG. 4 illustrates a method of classifying images using trained classification models according to an example embodiment.

FIG. 4 illustrates a method/system 400 of classifying images using trained classification models according to an example embodiment. Referring to FIGS. 1-4, the trained classification model (i.e., trained convolutional neural network) that resulted from training of the classification model described above includes convolution and pooling layers 406, fully connected layers 410, and a logits layer 412 as illustrated in FIG. 4. The trained convolutional neural network of FIG. 4 is effectively the convolutional neural network of FIG. 3 at the end of the training process. To illustrate, the convolution and pooling layers 406 corresponds to the convolutional neural network 306, the fully connected layers 410 corresponds to the fully connected layers 310 and the logits layers 412 corresponds to the logits layers 312 with the exception of difference in parameter settings. Input images 402 that need to be classified may be provided from an image source such as the input image source 106 or another source. In some example embodiments, the input images may be pre-processed in a similar manner as described with respect to the training images.

For a given input image, the trained classification models from the step 204 of the method 200 and from the method of 300 output confident scores for each label. The output of the soft-sigmoid activation logits layer 412 generate independent sigmoid confidence score for each label in contrast to convolutional neural networks that use softmax activation resulting in confidents scores that are distributed between all labels to have a summation of the score equals to one. Confidence scores indicate the level of confidence that an object in the image or an image is classified correctly in a particular class (i.e., a particular label). For example, a score of 1 may indicate a highest confidence level, and a score of 0 may indicate the lowest confidence level. By using soft-sigmoid activation, the methods 200, 300, and 400 enable classification of an image and objects/elements in an image into multiple classes as shown by the classification/labeling output 414. That is, multiple labels (i.e., multi-labels) may be associated with an image. For example, an image may be tagged with multiple labels and may not be limited to a single class.

Figure 5:
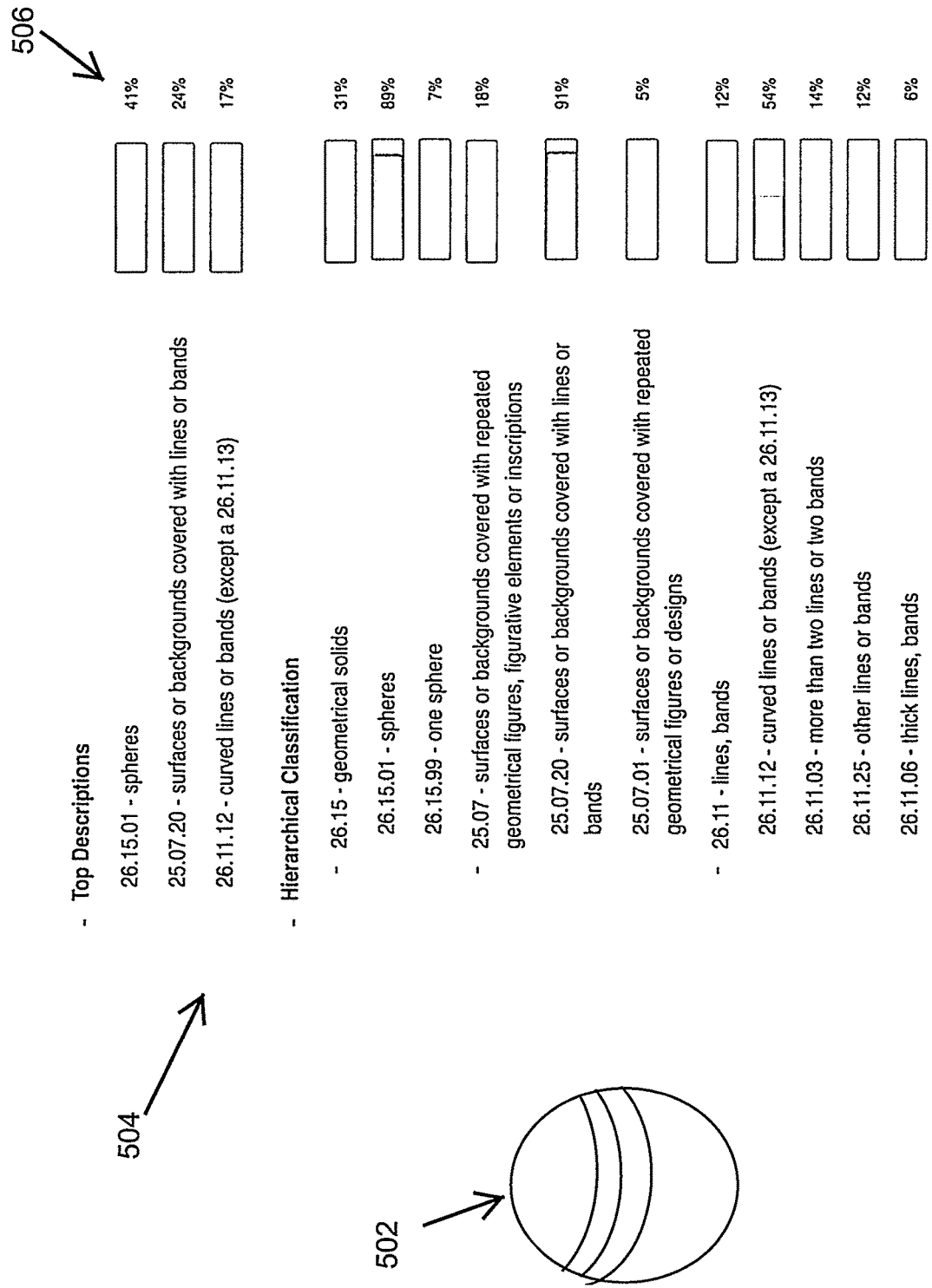
FIG. 5 illustrates classification/labelling of an image using the system of FIG. 1 and based on the methods of FIGS. 2, 3, and 4.

FIG. 5 illustrates classification/labelling of an image (e.g., a graphically designed image) using the system 100 and based on the methods 200, 300, and 400. As illustrated in FIG. 5, the image 502 is classified into three classes (i.e., associated with three multi-labels) as shown by the classes/labels 504 along with confidence scores 506 provided in percentages.

Figure 6:
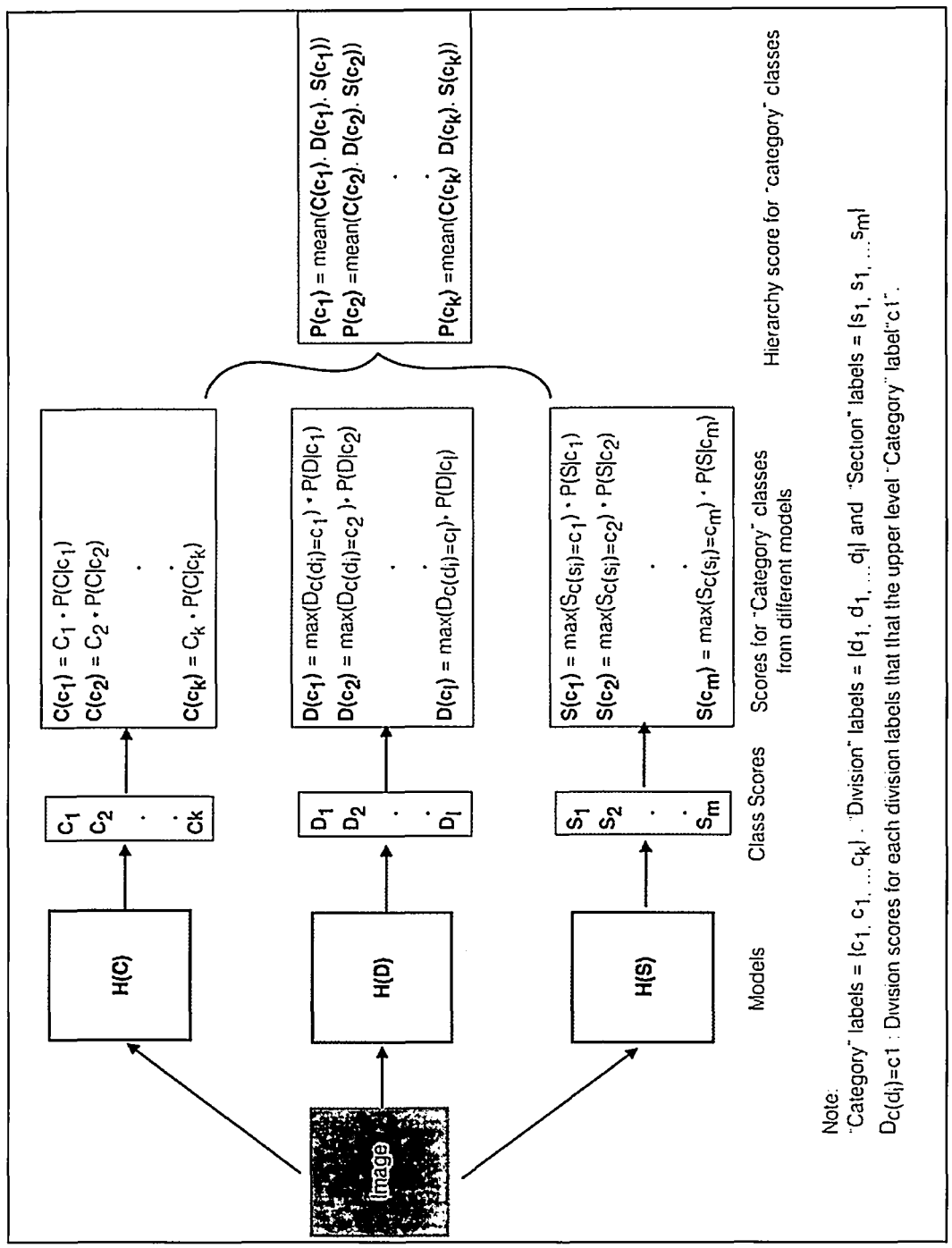
FIGS. 6-8 illustrate classification of input images based on trained classification models for each hierarchy level of the multi-labels according to an example embodiment.
Figure 7:
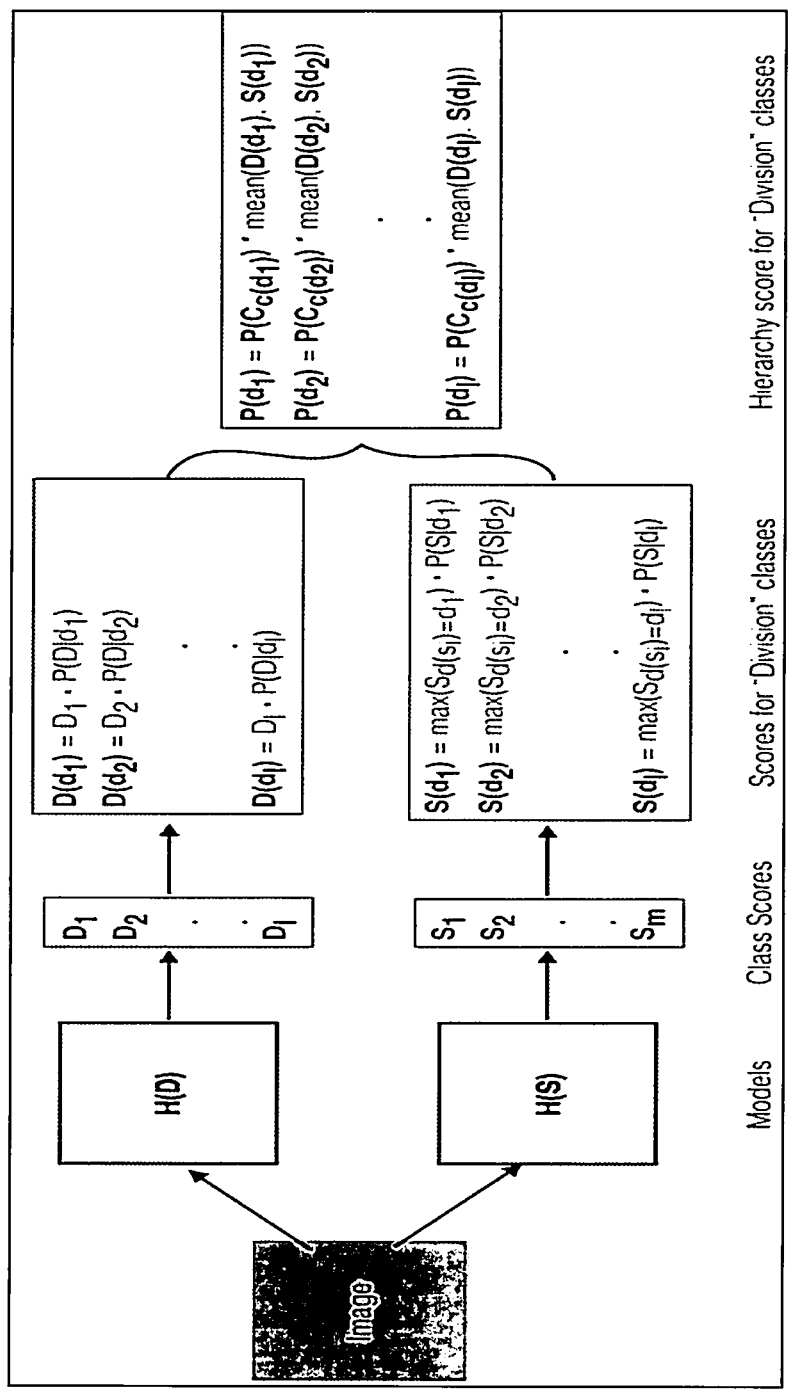
Figure 8:
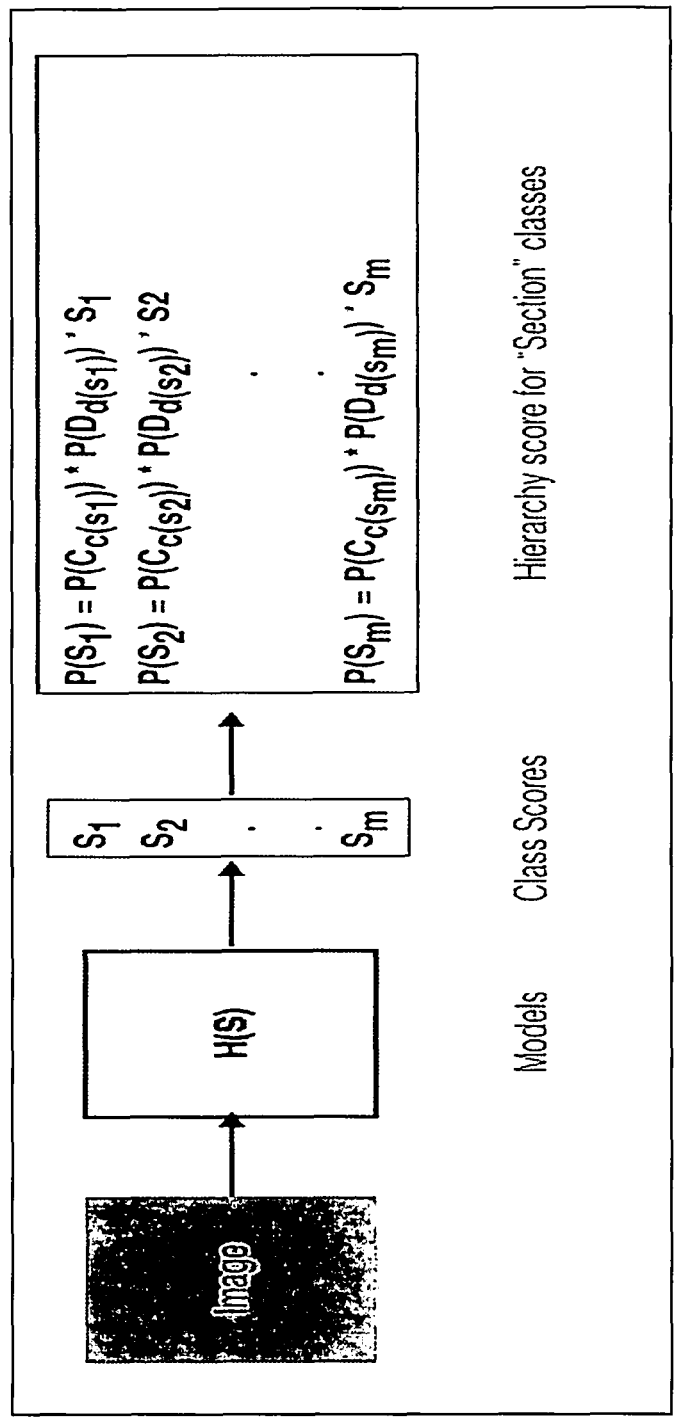

FIGS. 6-8 illustrate classification of input images based on trained classification models for each hierarchy level of the multi-labels according to an example embodiment. In some example embodiments, separate classification models may be trained for each level of hierarchy of hierarchical labels, as described above. To illustrate, trademark labels such as US-design codes and Vienna-codes are built upon a hierarchical structure from "Category"→"Division"→"Section," as illustratively shown in Table 1. The trained classification models for each hierarchy level (for example, H(C) for "Category", H(D) for "Division" and H(S) for Section) may be used to determine a final classification of an image or an object in an image. The hierarchy information together with information on each of the classification models from prior statistics may be used to robustly classify each category, division and section labels. FIGS. 6-8 illustrate how the identified labels for each of the hierarchical levels are used to refine the final scores.

To illustrate, probability scores for each class/label are computed from higher level to lower label in hierarchy. Confidence score for the higher level label from each model is computed and averaged as shown in FIG. 6. For each lower level, the probability score for the current level label is multiplied by the probability score of the corresponding higher level label as shown in FIGS. 7 and 8.

With the large amount of training images, prior statistics of each classification model's reliability towards correctly indicating a class/label to be associated with an input image may also be incorporated in computing the scores. To illustrate, prior probabilities that measure the accuracy of each hierarchy level classification model (for example, H(C) for "Category", H(D) for "Division" and H(S) for Section) for a given class are pre-computed based on the statistics that extracted from, for example, millions of training data. For example, $P(C|c1)$ is how good the category model in predicting on c1 class. Confidence scores for a label, (e.g., c1) from its children's model (D or S) is computed by multiplying the maximum confidence of its child labels ($D(c(di)==c1)$ or $S(c(si)=c1)$) from its relevant model with the prior statistics of the classification model's confidence score for the given label. The final confidence score for the label can be defined by mean of confidences from each of its child models, multiplied by the parent probability. The parent probability (confidence score) is defined by the probability of the upper level hierarchy label to which that the child label belongs.

The above described systems and methods may be used to train deep convolutional neural network(s) to classify images based on semantically descriptive (semantic visual) labels that may have hierarchical structures. Example descriptions of three-level hierarchy labels used in US design codes to describe trademark images are shown in Table 1 above. Examples of multi-labels in the design patent/industrial design space include Locarno classifications and Product Indications.

As described above, in an example embodiment of a method of training an image classification system, a large-scale logo dataset may be used for training convolutional neural networks (i.e., classification models). The trademark images (typically graphically designed images) and the trademark image codes are used as labels as input into the deep learning system (i.e., a system based on deep convolutional neural network(s)). Use of trademarks as training image dataset provides a large resource of images that may be used to train deep convolutional neural networks for classification of images, logos, etc. As described above, the systems and methods described herein may be used in applications involving classification of industrial designs and a combination of trademarks and designs.

System benchmarking may be performed against both logo datasets (trademarks) and large scale photo datasets (ImageNet), as well as more application specific datasets such as e-commerce site images (usually product photos which can be either photos, digitally altered merchandise, or just plain logos). As described above, images, both training images and input images to be classified, may undergo preprocessing to normalize white balance, remove noise, scale images, etc.

Additionally, the metadata including labels and other relevant information can be preprocessed. Not all trademark meta data will be useful in general, some descriptors are more meaningful than others (for instance describing an image as containing segments is less useful than describing an image as 2 connected segments forming a checkmark). Relevance statistics for these labels can be collected beforehand to feed into the supervised training process of a deep network.

Additionally, as described above, different levels of metadata (i.e., hierarchical labels) can be differentiated, from most specific to least specific. For instance, a very specific meta data label for an image might be Trademark application number 11111 (trademark identified), a higher level label is the brand name "Twitter" (brand/owner), a higher level yet again is "Sparrow", "Bird", "Animal" (for instance, like the VC category, division, section hierarchy e.g. "02.01.01", "02.01", "02"). These different levels of description and labels are used for training.

The above formatted information may be used to train a convolutional neural network (i.e., classification model), which comprises of a multi-level architecture of alternating convolution and max pooling layers, typically with a final layer as a classifier, as described above. In an example embodiment, the above labels can be used to train the last layer. In systems and methods that are based on convolutional neural networks, convolution and max pooling reduces dimensionality through effectively clustering the features resulting from the convolution. Each layer of convolution provides a set of higher-level features with different representation. Understanding what architecture suits the level of semantic labels will help with training.

The systems and methods described herein enable accurate classification of visual elements or objects in graphically designed images such as trademarks, logos, and images of industrial designs including product designs. Taking advantage of hierarchical levels of multi-labels by training per-hierarchy classification models may result in even more reliable classifications. Objects and elements in photographs may also be classified using the systems and methods described herein. Applications include improving clearance search and watches for image-based trademarks (and common law logos) and industrial design for protection against infringement, as well as wide applicability in a variety of domains such as media monitoring, security, and consumer applications.

The systems and methods described herein may be used in many applications. For example, by using already established code standards for imaging labelling, the systems and methods may be used to protect intellectual property of graphically designed images, where the images are labelled by examiners according to the industry standard (Vienna code, design code and keyword, etc.). The labels can be used to train classification models on hierarchically labelled classes as mentioned above, and the trained classification models may be used to generate code suggestions for examiners during new registrations and help to find similar design/trademark images by providing the image or an object in the image desired to be registered to the classification system described herein. Such code generation capability may also be used with design patents and industrial design registrations. The trained classification models can also be used to look for infringement by similar design of a graphic image.

In some example embodiments, image searches may be performed based on the class-labels. To illustrate, combination of object labels describe the uniqueness of an. The trained classification models may be used to label or otherwise associate with labels images and objects in images. By using the trained classification models that can automatically generate all the combination of object labels, the image can be searched against large scale dataset for similarity.

In some example embodiments, web-image search may be performed based on metadata. Similar approaches as described above can be used to search for similar image on the web. Classification models trained on metadata also can be used to automatically index an uploaded image to the database. The systems and methods described herein may also be used to perform trademark and design clearance search and provide watch services.

In some example embodiments, reverse-image search may be performed using the systems and methods described herein with additional features from the outputs of the trained networks (visually encoded feature maps—intermediate network layers and/or auto generated semantic labels). Further, by having separate models for different hierarchy levels of labels, image search can be performed to look into different level of details in similarity. For example, matching twitter logo can be performed with the expectation of getting the results with: i) the exact shape/color/texture of the twitter logo; ii) a logo with the combination of birds in flight or with outspread wings, woodpeckers, other birds; pigeons; ravens; robins; crows; cardinals; doves; iii) type of animals; or iv) a logo with any animal.

In general, the systems and methods described herein can be used to train very large (wide/deep) deep learning models on the world's largest corpus of logo training image data with independent, hierarchical, multi label information. Such systems and methods can easily handle over 5 million trademark images and thousands of class labels during the training processes.

Although embodiments of the methods have been described, it is to be understood that such a system is not necessarily limited to the specific features or algorithms described. Rather, the specific features and algorithms are disclosed as example forms of implementing such systems.

Although some embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

The invention claimed is:

1. A method of classifying images using one or more image classification models, comprising:
   obtaining, by processing circuitry, training images associated with labels, wherein at least one training image of the training images is associated with two or more labels of the labels, each label corresponding to an image classification class, the labels having a hierarchical structure;
   training, by the processing circuitry, at least two convolutional neural networks using the training images and the hierarchically-structured labels associated with the training images, a separate convolutional neural network being trained for each level of the hierarchical structure; and
   classifying, by the processing circuitry, an input image into two or more classes based on the trained at least two convolutional neural networks, the classifying the input image including
      multiplying a probability score output from a first trained convolutional neural network for a label by a probability score output from a second trained convolutional neural network for the label.

2. The method according to claim 1, wherein a classification layer of each respective convolutional neural network is based on soft-sigmoid activation, the soft-sigmoid activation being a combination of a softmax function and a sigmoid function.

3. The method according to claim 1, wherein the training images and the input images include graphically-designed images.

4. The method according to claim 1, wherein the labels are non-mutually exclusive labels.

5. The method according to claim 1, wherein the labels are codes used by a trademark registration organization.

6. The method according to claim 1, wherein the labels are codes used to classify design patent images or industrial design images.

7. The method according to claim 1, wherein the labels are available as metadata of the training images associated with the labels.

8. The method according to claim 1, wherein the classifying further includes
labelling the input image with two or more labels corresponding to the two or more classes.

9. The method according to claim 1, further comprising
pre-processing, by the processing circuitry, the training images, wherein the training the at least two convolutional neural networks is based on the pre-processed training images and the labels associated with the training images.

10. An apparatus for classifying images using one or more image classification models, comprising:
processing circuitry configured to
obtain training images associated with labels, wherein at least one training image of the training images is associated with two or more labels of the labels, each label corresponding to an image classification class, the labels having a hierarchical structure,
train at least two convolutional neural networks using the training images and the hierarchically-structured labels associated with the training images, a separate convolutional neural network being trained for each level of the hierarchical structure, and
classify, by multiplying a probability score output from a first trained convolutional neural network for a label by a probability score output from a second trained convolutional neural network for the label, an input image into two or more classes based on the trained at least two convolutional neural networks.

11. The apparatus according to claim 10, wherein a classification layer of each respective convolutional neural network is based on soft-sigmoid activation, the soft-sigmoid activation being a combination of a softmax function and a sigmoid function.

12. The apparatus according to claim 10, wherein the training images and the input images include graphically-designed images.

13. The apparatus according to claim 10, wherein the labels are non-mutually exclusive labels.

14. The apparatus according to claim 10, wherein the labels are codes used by a trademark registration organization.

15. The apparatus according to claim 10, wherein the processing circuitry is further configured to
pre-process the training images, the training the at least two convolutional neural networks being based on the pre-processed training images and the labels associated with the training images.

16. A non-transitory computer-readable storage medium storing computer-readable instructions that, when executed by a computer, cause the computer to perform a method for classifying images using one or more image classification models, comprising:
obtaining training images associated with labels, wherein at least one training image of the training images is associated with two or more labels of the labels, each label corresponding to an image classification class, the labels having a hierarchical structure;
training at least two convolutional neural networks using the training images and the hierarchically-structured labels associated with the training images, a separate convolutional neural network being trained for each level of the hierarchical structure; and
classifying, by multiplying a probability score output from a first trained convolutional neural network for a label by a probability score output from a second trained convolutional neural network for the label, an input image into two or more classes based on the trained at least two convolutional neural networks.

17. The non-transitory computer-readable storage medium according to claim 16, wherein a classification layer of each respective convolutional neural network is based on soft-sigmoid activation, the soft-sigmoid activation being a combination of a softmax function and a sigmoid function.

18. The non-transitory computer-readable storage medium according to claim 16, wherein the training images and the input images include graphically-designed images.

19. The non-transitory computer-readable storage medium according to claim 16, wherein the labels are non-mutually exclusive labels.

20. The non-transitory computer-readable storage medium according to claim 16, wherein the labels are codes used by a trademark registration organization.

* * * * *

UNITED STATES PATENT AND TRADEMARK OFFICE
CERTIFICATE OF CORRECTION

| | | |
|---|---|---|
| PATENT NO. | : 11,687,781 B2 | |
| APPLICATION NO. | : 17/308440 | |
| DATED | : June 27, 2023 | |
| INVENTOR(S) | : Sandra Mau et al. | |

It is certified that error appears in the above-identified patent and that said Letters Patent is hereby corrected as shown below:

In the Specification

Column 10, Line 60, change "labels 304" to --multi-labels 304--

Signed and Sealed this
Thirteenth Day of February, 2024

Katherine Kelly Vidal
*Director of the United States Patent and Trademark Office*